(12) United States Patent
Beattie et al.

(10) Patent No.: US 9,428,408 B2
(45) Date of Patent: Aug. 30, 2016

(54) METHOD AND APPARATUS FOR TREATING TAILINGS USING AN AC VOLTAGE WITH A DC OFFSET

(71) Applicant: DPRA Canada Incorporated, Concord (CA)

(72) Inventors: Bruce S. Beattie, Vista, CA (US); Paul Garcia, Temecula, CA (US); Doug Kimzey, Knoxville, TN (US); Ben Harris, Fallbrook, CA (US); Robert C. Parrott, Knoxville, TN (US); James Micak, Ontario (CA)

(73) Assignee: DPRA Canada Incorporated, Toronto, Ontario (CA)

( * ) Notice: Subject to any disclaimer, the term of this patent is extended or adjusted under 35 U.S.C. 154(b) by 0 days.

(21) Appl. No.: 14/047,730

(22) Filed: Oct. 7, 2013

(65) Prior Publication Data
US 2015/0096901 A1    Apr. 9, 2015

(51) Int. Cl.
*C02F 1/463* (2006.01)
*C02F 103/10* (2006.01)

(52) U.S. Cl.
CPC .......... *C02F 1/463* (2013.01); *C02F 2103/10* (2013.01); *C02F 2201/4613* (2013.01)

(58) Field of Classification Search
USPC .......................... 205/742, 761; 204/225, 242
See application file for complete search history.

(56) References Cited

U.S. PATENT DOCUMENTS 3,767,046 A * 10/1973 Hartkorn ...................... 210/703
3,962,069 A    6/1976 Inoue et al.
4,107,026 A    8/1978 Freeman
4,110,189 A    8/1978 Kunkle et al.
4,134,820 A    1/1979 Ellis et al.
4,170,529 A    10/1979 Freeman
4,282,103 A    8/1981 Fuhr et al.
4,337,136 A    6/1982 Dahlgren
4,437,998 A    3/1984 Yong
4,501,648 A    2/1985 Ritter (Continued)

FOREIGN PATENT DOCUMENTS

CA    2549198    11/2007
CA    2590990    11/2007

(Continued)

OTHER PUBLICATIONS

Beier et al., "The Oil Sand Tailings Research Facility", Geotechnical News, Jun. 2008, pp. 72-77.

(Continued)

*Primary Examiner* — Arun S Phasge
(74) *Attorney, Agent, or Firm* — Boyle Fredrickson, S.C.

(57) ABSTRACT

There is a method of facilitating the consolidation of fine tailings through the application of an electrical current. The fine tailings include a combination of at least some water and some clay particles. Electrodes are placed into contact with the fine tailings. An AC voltage with a DC offset is applied to the electrodes to separate water from the clay particles and to induce movement of the separated water to a collection area. The separated clay particles can consolidate more readily than unseparated clay particles. In an embodiment, the fine tailings are mixed fine oil sands extraction tailings which include residual hydrocarbons. In an embodiment, the application of an AC voltage with a DC offset across the electrodes includes applying an AC voltage of about 1 V/cm and a DC offset of about ½ V/cm.

16 Claims, 6 Drawing Sheets

(56) References Cited

U.S. PATENT DOCUMENTS

| | | | |
|---|---|---|---|
| 4,623,442 | A | 11/1986 | Ritter |
| 4,960,524 | A | 10/1990 | Inculet et al. |
| 5,171,409 | A | 12/1992 | Barnier et al. |
| 5,621,844 | A | 4/1997 | Bridges |
| 6,179,977 | B1 | 1/2001 | Herbst |
| 6,596,142 | B2 | 7/2003 | McGee |
| 6,800,186 | B1 | 10/2004 | Forand et al. |
| 2002/0011436 | A1 | 1/2002 | Blanchette et al. |
| 2004/0026238 | A1 | 2/2004 | Ende et al. |
| 2007/0204994 | A1 | 9/2007 | von Wimmersperg |
| 2007/0267355 | A1 | 11/2007 | Jones et al. |
| 2009/0142137 | A1 | 6/2009 | Michailuck et al. |
| 2009/0288959 | A1 | 11/2009 | Nakano |
| 2012/0138511 | A1 | 6/2012 | Kimball et al. |
| 2012/0255872 | A1 | 10/2012 | Smith et al. |
| 2012/0292186 | A1 | 11/2012 | Adamson |
| 2014/0008229 | A1 | 1/2014 | Garcia et al. |
| 2014/0131206 | A1 | 5/2014 | Yazdanbod |

FOREIGN PATENT DOCUMENTS

| | | |
|---|---|---|
| CA | 2645091 | 5/2009 |
| CA | 2634841 | 12/2009 |
| CA | 2668784 | 12/2009 |
| CA | 2698880 | 10/2011 |
| CA | 2726098 | 10/2011 |
| CA | 2736196 | 10/2011 |
| CA | 2741020 | 2/2012 |
| CA | 2758872 | 10/2012 |
| CA | 2757955 | 5/2013 |
| CA | 2782949 | 1/2014 |
| CA | 2783819 | 4/2014 |
| CA | 2736675 | 8/2014 |
| JP | 06154762 | 6/1994 |
| JP | 06154764 | 6/1994 |
| JP | 2004190417 | 7/2004 |
| WO | 2008112493 | 9/2008 |
| WO | 2014008581 | 1/2014 |

OTHER PUBLICATIONS

Mikula at al., "Water Use In Bitumen Production: Tailings Management in Surface Mined Oil Sands", Canadian International Petroleum Conference Paper 2008-097.

Reddy et al., "Overview of Electrochemical Remediation Technologies", ISBN 978-0-470-38343-8, John Wiley & Sons, Inc., New York, NY 2009.

Mohamedelhassan, "Electrokinetic Sedimentation and Dewatering of Clay Slurries", Dec. 2008.

Reddy at al., "Enhanced Electrokinetic Remediation of Heavy Metals in Glacial Till Soils Using Different Electrolyte Solutions". Journal of Enivronmental Engineering, ASCE/Apr. 2004, pp. 442-455.

Reddy et al., "Nutrient Amendment for the Bioremediation of a Chromium-Contaminated Soil by Electrokinetics", Energy Sources, 25:931-943, 2003.

Mikula et al., "Centrifuge Options for Production of 'Dry Stackable Tailing' in Surface Mined Oil Sands Tailings Management", Canadian International Petroleum Conference Paper 2008-095.

"Leopold Clari-Vac Floating Sludge Collector Simply Powerful Sludge Removal for Water and Wastewater Treatment Plants" ITT Advanced Water Treatment, Zelienople, PA, 2006.

Kantardjieff et al., "Improved Dewatering of Pulp And Paper Mill Sludges", 1997 Environmental Conference & Exhibit, pp. 723-727.

Hiler et al., "Electrokinetic Removal of Colloids from Suspension". Transaction of the ASAE 1965, pp. 79-82.

Lambe, "Soil Testing for Engineers", 1951, John Wiley & Sons, Inc., New York, NY, 89 pages.

Kosmulski, "Surface Charging And Points Of Zero Charge", vol. 145, CRC Press, 2009, 5 pages.

Hough, "Basic Soils Engineering", Chapter 3, The Ronald Press Company, New York, NY, 1957, 36 pages.

Weast, Handbook of Chemisty and Physics, 56th Edition, CRC Press, Cleveland Ohio, 1975, 34 pages.

Brevik, I, "Experiments in Phenomenological Electrodynamics and the Electromagnetic Energy-Momentum Tensor", Physics Reports, 1978, pp. 135-201.

Brevik, I, "Fluids in electric and magnetic fields: Pressure variation and stability", Canadian J. Physics, 60, 1982, pp. 449-445.

Suzuki et al, "Development of continuous Dehydrator for Fish Meat by Electroosmotic Method".

Mahmoud et al., "Electrical field: A historical review of its application and contributions in wastewater sludge dewatering", Water Research 44 (2010) 2381-2407.

Friehmelt et al., "Electrokinetic Dewatering Process for Industrial Sludge", BIOSYS-Institute of applied science, Vionvillestrasse 20, 28211 Bremen, Germany, 8 pages.

Guo et al., "A study of electrokinetic dewatering of oil sands tailings", Environmental Geotechnics, vol. 1, Issue EG2, pp. 121-134, May 1, 2014.

Hiler, "Electrokinetic Movement of Suspended Colloids In A Flowing Medium", The Ohio State University, Dissertation 1966, 88 pages.

Ishida et al., "Dielectric-Relaxation Spectroscopy of Kaolinite, Montmorillonite, Allophane, and Imogolite Under Moist Conditions", Clays and Clay Minerals, vol. 48, No. 1, 75-84, 2000.

Melloni, A. et al., "Direct measurement of electrostriction in optical fibers" Optics Letters, vol. 23, No. 9, May 1, 1988, pp. 691-693.

Rogers et al., "Acute and Subchronic Mammalian Toxicity of Naphthenic Acids from Oil Sands Tailings", Toxicological Sciences 66, 347-355 (2002).

Schroth et al., "Surface Charge Properties of Kaolinite", Clays and Clay Minerals, vol. 45, No. 1, 85-91, 1997.

Smith et al., "Monitoring Soil Consolidation During In Situ Electrical Resistivity Heating", Proceeding of the Fifth International Conference on Remediation of Chlorinated and Recalcitrant Compounds, May 22-25, 2006, Monterey, CA, 9 pages.

Mohamedelhassan et al, "Electrokinetic Sedimetation & Dewatering of Clay Slurries", Dec. 2008, 28 pages.

Cavendish, How It Works Science And Technology, 554 (2003).

BCG Eng., Inc., "Oil Sands Tailings Technology Review", Jul. 2010.

Bohm et al., "Water Management and the Use of Thickened Tailings", Sustainable Improvement in Safety of Tailings Facilities, Oct. 2005.

http://www.fkcscrewpress.com/spintro.html, Dec. 7, 2004.

\* cited by examiner

METHOD AND APPARATUS FOR TREATING TAILINGS USING AN AC VOLTAGE WITH A DC OFFSET

FIELD OF THE INVENTION

This invention relates generally to the broad field of pollution control. More particularly, this invention relates to methods and apparatus that can be used to mitigate the persistent nature of certain types of tailings ponds, such as tailings ponds filled with waste products from tar or oil sand recovery processes and similar water bearing colloidal minerals in tailings suspensions from mining operations. Such mitigation allows land reclamation to occur.

BACKGROUND OF THE INVENTION

Oil or tar sands are a source of bitumen, which can be reformed into a synthetic crude or syncrude. At present a large amount of hydrocarbon is recovered through surface mining. To obtain syncrude, the hydrocarbons must be first separated from the sand base in which it is found. This sand based material includes sands, clays, silts, minerals and other materials. The most common separation first step used on surface mined tar sands is the hot water separation process which uses hot water to separate out the hydrocarbons. However, the separation is not perfect and a water based waste liquid is produced as a by-product which may include small amounts of hydrocarbon, heavy metals, and other waste materials. The oil producers currently deal with what they call Fresh Fine Tailings (FFT) and Mature Fine Tailings (MFT); the distinction between the two being that MFT are derived from FFT after allowing sand to settle out over a period of typically 3 years. MFT are mostly a stable colloidal mixture of water and clay, and other materials, and is collected in onsite reservoirs called tailings ponds.

Oil extraction has been carried out for many years on the vast reserves of oil that exists in Alberta, Canada. It is estimated that 750,000,000 $m^3$ of MFT have been produced. Some estimates show that 550 $km^2$ of land has been disturbed by surface mining yet less than 1% of this area has been certified as reclaimed. A 100,000 bbl/day production facility produces 50,000 tonnes per day of FFT, which is equivalent to approximately 33,500 $m^3$ of FFT per day.

The FFT and MFT present three environmental and economic issues: water management, sterilization of potentially productive ore, and delays in reclamation. Although concentrations vary, MFT/FFT can typically comprise 50 to 70% water. This high water content forms, in combination with the naturally occurring clays, a thixotropic liquid. This liquid is quite stable and persistent and has been historically collected in large holding ponds. Very little has been done to treat the MFT that has been created and so it continues to build up in ever larger holding ponds. As development of the tar sands accelerates and more and more production is brought on line, more and more MFT/FFT will be produced. What is desired is a way to deal with the MFT/FFT that has been and will be generated to permit land reclamation, release of captured water and provide access to the productive ore located beneath such ponds.

MFT/FFT represents a mixture of clays (Mite, and mainly kaolinite), water and residual bitumen resulting from the processing of oil sands. In some cases MFT may also be undergoing intrinsic biodegradation. The biodegradation process creates a frothy mixture, further compounding the difficulty in consolidating this material. It is estimated that between 40 and 200 years are required for these clays to sufficiently consolidate to allow for reclamation of tailings ponds. Such delays will result in unacceptably large volumes of MFT, and protracted periods of time before reclamation certification can take place unless a way to effect disposal and reclamation is found. The oil sands producers are required by a directive of the Energy Resources Conversation Board to treat their tailings to a bearing capacity of 5 kPa by 2012 and 10 kPa by 2015.

Applied electrical fields have been used to dewater soils for construction projects to improve bearing capacity. Electrophoresis has been used in many industries, such as the pharmaceutical industry and ceramics industry to produce high grade separations. Electrostriction has been used to create high density ceramics. In electrical resistance heating treatment at Fargo, N. Dak. (Smith et al., 2006)[a], electrastrictive phenomenon has been observed in the application of an electric field to already consolidated clays where the applied electric field ranged between 0.46 to 0.8 volt/cm. Examples of applications of electrical fields in various circumstances can be found in the following prior patents.

[a] Smith, G. J., J. von Flatten, and C. Thomas (2006) Monitoring Soil Consolidation during Electrical Resistivity Heating. Proceedings of the Fifth International Conference on Remediation of Chlorinated and Recalcitrant Compounds, May 22-25, 2006, Monterey, Calif., U.S. Pat. No. 3,962,069
U.S. Pat. No. 4,107,026
U.S. Pat. No. 4,110,189
U.S. Pat. No. 4,170,529
U.S. Pat. No. 4,282,103
U.S. Pat. No. 4,501,648
U.S. Pat. No. 4,960,524
U.S. Pat. No. 5,171,409
U.S. Pat. No. 6,596,142

The application of electrical current to oil sands tailings has also been tried, as shown in U.S. Pat. No. 4,501,648. However, this teaches a small device with a tracked moving immersed electrode onto which is deposited clay solids. The electrode is moved out of contact with the liquid and then the solids are scraped off the electrode. A chemical pre-treatment step is required to achieve the desired deposition rate on the immersed electrode. While interesting, this invention is too small to be practical for MFT/FFT treatment and requires a chemical pre-treatment step which adds to the cost.

The application of electrical fields to treat small-scale clay deposits may not require efficient use of energy. However, on a large scale, the application of an electrical current requiring high power consumption or requiring an application of an electrical current over a long period of time may be prohibitively expensive or impossible to carry out due to the available resources. At remote sites, large-scale access to electrical power may be limited. Small variations in electrical current draws may have significant impact on costs and power requirements when dealing with millions of square meters of MFT and FFT.

What is desired is a way to deal with vast volumes of MFT/FFT that will need to be treated without excessive power expenditures. What is desired is a practical system for dealing with tailings efficiently and quickly. What is also desired is a way to extract water from large volumes of MFT/FFT which can be re-used for other purposes.

SUMMARY OF THE INVENTION

In an embodiment of the present invention there is a method of facilitating the consolidation of fine tailings through the application of an electrical current. The fine tailings include a combination of at least some water and some clay particles. At least two electrodes are caused to come into contact with the fine tailings. An alternating current (AC) voltage with a direct current (DC) offset is applied across the at least two electrodes to separate water from the clay particles and to induce movement of the separated water to a collection area wherein said separated clay particles can consolidate more readily than unseparated clay particles.

In another embodiment of the present invention there is an apparatus for consolidating tailings at a tailings pond through the application of an electrical current. At least two electrodes are connected to a power supply. A support structure supports the at least two electrodes at a fixed distance from each other when immersed in said tailings. A dielectric moveable sleeve surrounds at least one of the at least two electrodes to define an insulated section of the electrode within the sleeve and an uninsulated section of the electrode beyond the sleeve. A buoyant member floats on said tailings. A connector provides a connection between the buoyant member and the moveable sleeve wherein as more tailings are added and the level of tailings rise, the buoyant member raises the dielectric moveable sleeve to permit the application of the electrical current to facilitate consolidation of the added tailings.

In another embodiment there is a method for consolidating tailings at a tailings pond through the application of an electrical current. The fine tailings include a combination of at least some water and some clay particles. At least two electrodes are placed into contact with the fine tailings, the at least two electrodes having an uninsulated section and an insulated section. An AC voltage with a DC offset is provided to the at least two electrodes to induce separation of the water from the clay particles. A power supply is provided which is capable of delivering the AC voltage with the DC offset. Added tailings are introduced to the tailings pond. The area of the uninsulated sections of the at least two electrodes which are in contact with the tailings are increased as the level of tailings rises to permit the application of the electrical voltages from the power supply to facilitate consolidation of successive layers of the tailings.

The application of the AC voltage with a DC offset may reduce the power consumption required and improve the water separation as compared with either AC or DC alone.

BRIEF DESCRIPTION OF THE DRAWINGS

Reference will now be made to preferred embodiments of the invention, by way of example only, with reference to the following figures in which.

DETAILED DESCRIPTION OF THE PREFERRED EMBODIMENTS

Figure 1:
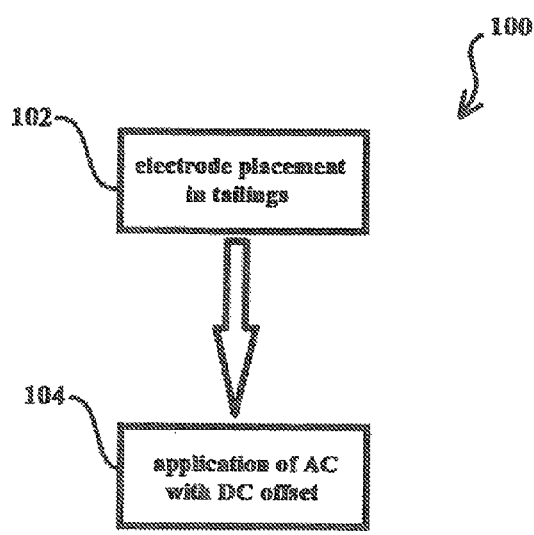
FIG. 1 is a flow diagram of a method of treating tailings with an AC voltage with a DC offset.

In this specification the terms MFT, or MFT/FFT or FFT shall mean the tailings that exist in tailings ponds that arise from the extraction of hydrocarbons, such as bitumen, from tar or oil sands, bauxite tailings ponds, fly ash tailings ponds, or other tailings ponds that are formed of a gel-like fluid which is a combination of at least some water and clay particles. As will be appreciated by those skilled in the art, the exact composition of MFT/FFT will vary, depending upon the composition of the ore being mined due to local variations in such ore. However, as used herein the term is intended to include compositions of material that include water, clays, silts, and in some cases residual hydrocarbons and hydrocarbon by-products among other things.

Canadian Patent Application No. 2,736,675, entitled "Electrokinetic Process and Apparatus for Consolidation of Oil Sands Tailings", published Oct. 7, 2012, Canadian Patent Application No, 2,758,872, entitled "Electrokinetic Process and Apparatus for Consolidation of Oil Sands Tailings", published Oct. 7, 2012, U.S. patent application Ser. No. 13/440,386, entitled "Electrokinetic Process and Apparatus for Consolidation of Oil Sands Tailings", published Oct. 11, 2012, and Canadian Patent Application No. 2,782,949, entitled "Method and Apparatus for Treating Tailings using Alternating Current", filed Jul. 9, 2012 ("the previous patent applications") each incorporated herein by reference, describe the application of electric fields to tailings ponds and releasing water from the tailings during the application of an electrical field.

The present patent document describes a method of treating tailings which includes the application of an AC voltage with a DC offset. The combination of AC and DC may provide a number of advantages. It may provide for the efficient use of power to achieve separation of the water. The system may be able to reverse polarity to reverse electrode effects of plating and erosion. It may cause water to migrate in one direction and particles in another direction. The present patent document also describes an exemplary electrode configuration which utilizes a floating electrode system.

In general, the greater the applied electric field to the MFT/FFT, the greater the applied force, the shorter the time period to achieve the desired degree of compaction, or the greater the degree of compaction that can be achieved. However, this may also result in the greater the amount of energy consumed, relating directly to cost. Further, water balance is important. The higher the applied electric field the greater the potential for increases in temperature and hence drying of the MFT/FFT. Drying MFT/FFT results in loss of electrical circuit and hence the electro kinetic treatment. It will be now understood by those skilled in the art that the present invention can be applied in various intensities, depending upon a balance of cost, timing and degree of compaction required. The design of the delivery system and equipment for the electrical energy can be based on the balance required between speed, cost and result required in the tailings pond being reclaimed or ex-situ treatment cells. Water chemistry of separated water is also a consideration.

The higher the voltage gradient, the greater the electromotive force, and as a result, the shorter the treatment time. However, there are three negative factors in applying a higher gradient: 1) the current density around the electrodes increases, resulting in "dry-out" and loss of electrical contact with the pore water carrying the current; 2) the greater the gradient, the closer electrode spacing, and increased apparatus costs; and 3) The electrical resistance of the MFT and FFT increases as water is released, making the timing of the application of higher electrical fields important. The voltage gradients and number and spacing of electrodes need to be evaluated on a case-by-case basis to determine the most economical design compared against the timeframe for treatment.

In the treatment of MFT/FFT with electrical fields, tests have been performed using both alternating current and direct current. It has been found that advantages may be achieved by employing AC with a DC offset which may also be referenced herein as direct current biased alternating current. The application of DC alone has been found to be less desirable because DC may cause the treated MFT/FFT material to dry out around the electrodes which impedes process efficiency since the dried material may prevent the electrodes from functioning and must be cleaned from the electrodes from time-to-time. Although the application of alternating current does not create issues with electrodes drying out, water migration is more limited than with the application of direct current. Experimentation has shown that the application of AC with a DC offset provides advantages over the application of AC or DC alone.

In some cases, it may be desirable to reuse water extracted from tailings for other purposes. For example, treated water may be recycled back for use in oil sands production and bitumen extraction. It has been discovered that the application of a high DC offset, to the tailings may have a negative effect on the quality of water which is extracted. Therefore, although a higher DC offset may allow more water to be extracted more quickly, it may result in higher pH water. In cases where lower pH is desired, a balance must be achieved between encouraging water migration using a sufficiently high DC offset with maintaining water quality with a sufficiently low DC offset.

The tailings are a combination of at least some water and clay particles. At least some water molecules are weakly bonded to the clay particles to form a gel-like fluid from which water does not readily separate, such as through evaporation.

In an embodiment there is a method provided of treating liquid tailings using the application of direct-current biased, alternating-current dielectrophoresis (DEP) to achieve water separation, fines compaction and bitumen separation/recovery, Electrodes are placed into the area that final deposition of the tailings will occur. A voltage difference is applied to the electrodes as tailings are added to the treatment area. Faradaic reactions that occur at the electrodes in the presence of a DC electric field create a difference in pH levels between the electrodes resulting in the formation of a conductivity gradient. This gradient combines with the electric field to result in the movement of fines and water toward the electrodes. Water flows to the surface forming a water cap. Solids compact near the exposed electrodes. In one embodiment, electrode exposure is controlled to limit contact with the extracted water through the use of a floating electrode sleeve assembly. The polarity of the electrodes may be reversed at regular controlled intervals to achieve uniform treatment and extend electrode life. Changes to water chemistry can be limited by minimizing the voltage gradient and the amount of DC offset used. The process is controlled by regulating the inflow and water extraction rates to maintain consistent electrode exposure and maximize throughput rate.

The electrical waveform applied by an electrode in material during electrokinetic remediation (EKR) Treatment is represented by equation 1, below. The schedule of parameters that define the electrical waveforms applied to electrodes during EKR Treatment is referred to as a parameter control schedule.

$$V_e(t) = \sum_{i=0}^{N} [U(t - t_{start_i}) - U(t - t_{end_i})] \cdot \{A_i + B_i \cdot \langle W_i \rangle (2\pi f_i \cdot t + \phi_i)\} \qquad V_{AC} \quad (1)$$

Where:
$V_e(t)$ is the piecewise waveform applied to a specific electrode e during EKR treatment
$U(t - a)$ is the Heaviside Unit Step function
$A_i$ is the DC offset in effect between $t_{start\ i}$ and $t_{end\ i}$
$B_i$ is the peak-to-peak amplitude in effect between $t_{start\ i}$ and $t_{end\ i}$
$\langle W_i \rangle$ is the waveform (i.e., sin, square, etc.) in effect between $t_{start\ i}$ and $t_{end\ i}$
$f_i$ is the frequency in effect between $t_{start\ i}$ and $t_{end\ i}$
$\phi_i$ is the phase offset in effect between $t_{start\ i}$ and $t_{end\ i}$ The Electrokinetic forces used in EKR Treatment are directly proportional to the magnitude of the electric field between electrodes. The electric field between electrodes may be approximated by the difference between the electrical waveforms applied to the electrodes divided by the distance between the electrodes. The geometrical configuration that determines the placement of each electrode determines the distance. A configuration that sets the spacing between two electrodes to d meters will apply an electrical field to the material between the two electrodes approximately equal to equation 2.

$$E(t) = [V_1(t) - V_2(t)]/d \qquad \text{V per meter} \quad (2)$$

Where:
$V_1(t)$ is the electrical waveform applied to electrode 1
$V_2(t)$ is the electrical waveform applied to electrode 2
d is the distance between electrodes 1 and 2 in meters.

In one embodiment there is a method 100 of facilitating the consolidation of fine tailings through the application of an electrical current as shown in FIG. 1. The fine tailings being consolidated include a combination of at least some water and some clay particles. At 102, at least two electrodes are caused to come into contact with the fine tailings. At 104, an AC voltage with a DC offset is applied across the at least two electrodes to separate water from the clay particles and to induce movement of the separated water to a collection area wherein said separated clay particles can consolidate more readily than unseparated clay particles. Once the water has been separated into the collection area, the water may be extracted. The water may be extracted continuously as the fine tailings are treated or at discrete times. For example, a pump may be connected to the collection area to remove separated water. The collection area may be an area within the tailings where water generally collects or a separate area such as defined within a sleeve surrounding the electrodes.

The application of an AC voltage with a DC offset creates a polarity between the at least two electrodes. In one embodiment, the polarity of the at least two electrodes may be periodically reversed to preserve the electrodes. For example, the polarity of the electrodes may be reversed at intervals of 5 minutes, although other time intervals may also be used. Although reversing the polarity of the electrodes may be advantageous to prevent particle build-up at the cathodes, reversing the polarity of the electrodes may make water extraction less efficient.

In a preferred embodiment, an AC voltage with a DC offset across the at least two electrodes in 104 includes applying an AC voltage of up to 4 μm peak-to-peak and a DC offset of up to 1 V/cm. In a most preferred embodiment, applying an AC voltage with a DC offset across the at least two electrodes comprises applying an AC voltage of about 1 V/cm peak-to-peak and a DC offset of about ½ V/cm.

In a preferred embodiment, applying an AC voltage with a DC offset at 104 further comprises applying alternating current at a frequency of about 10 Hz or less. In a most preferred embodiment, applying an AC voltage with a DC offset further comprises applying alternating current at a frequency of about 10 Hz.

It is contemplated that the method 100 can be applied to at least one of oil sands extraction tailings and fly ash tailings. In a preferred embodiment, the tailings are mixed fine oil sands extraction tailings which further include residual hydrocarbons.

Figure 2:
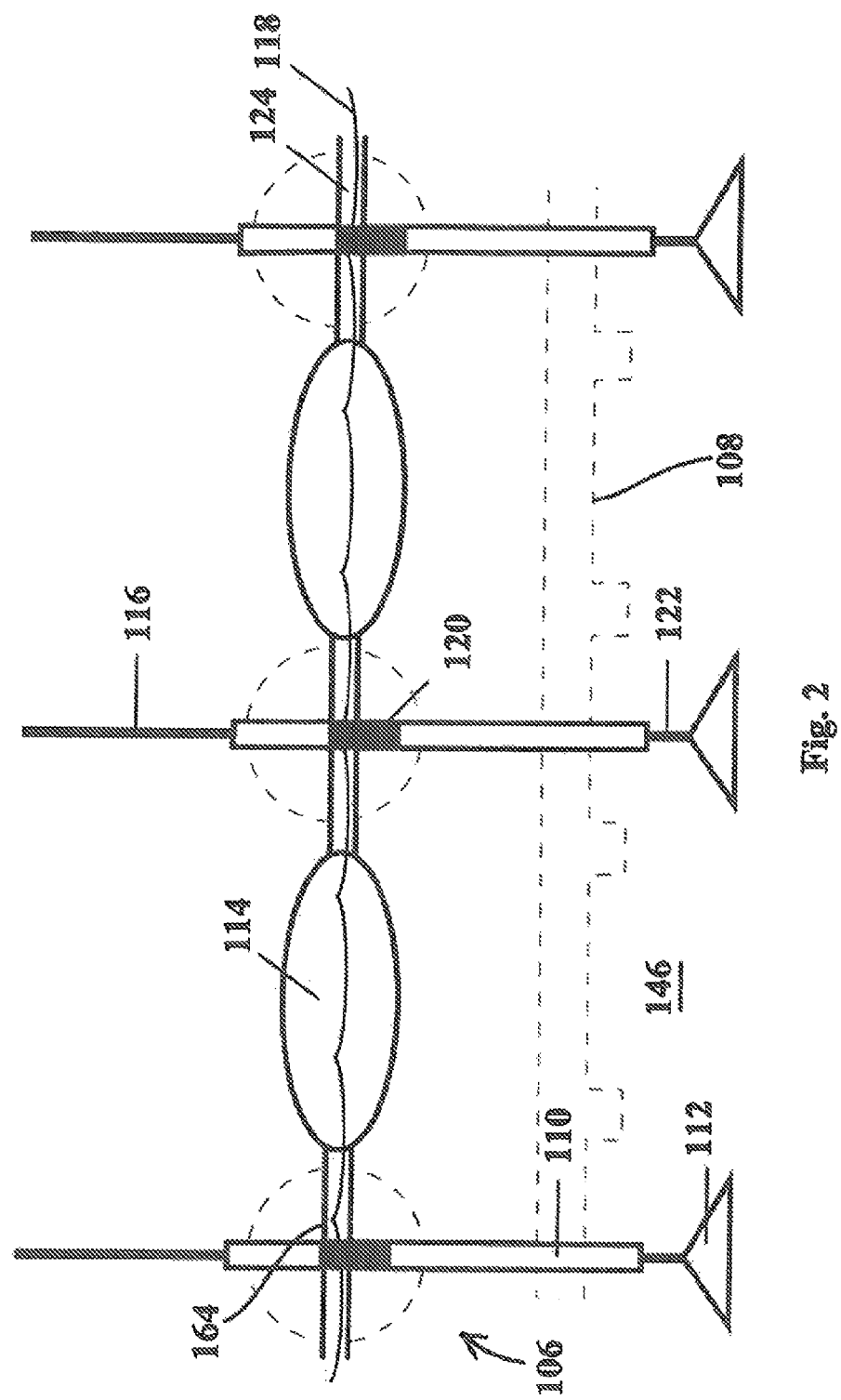
FIG. 2 is a side schematic view of a consolidation apparatus for treating tailings.

One apparatus used to effect the action of the present invention on MFT/FFT is described below and shown in FIGS. 2-5. FIG. 2 shows a consolidation apparatus 106 for consolidating tailings 146 at a tailings pond through the application of an electrical current. There are at least two electrodes 116 connected to a power supply 120 (FIG. 6) through power distribution cables 136 (FIG. 5) within a power distribution routing system 124. As shown in FIG. 4, the electrodes 116 are part of an array of electrodes 116 which are supported by a support structure, including anchors 112, and in which each of the array of electrodes 116 has a dielectric moveable sleeve 110 surrounding the electrode. Different numbers of electrodes may be used in the apparatus so long as there are at least two electrodes. The support structure, in the form of anchors 112, supports the electrodes 116 at a fixed distance from each other when immersed in said tailings 146. A dielectric moveable sleeve 110 surrounds the electrodes 116 to define an insulated section of the electrode within the sleeve 110 and an uninsulated section 122 of the electrode beyond the sleeve 110. A buoyant member 114 floats on the tailings 146 at the surface 118 of the tailings pond. A connector 164 lies between the buoyant member 114 and the moveable sleeve 110 so that as more tailings are added and the level of tailings 146 rise, the buoyant member 114 raises the dielectric moveable sleeve 110 to permit the application of the electrical current to facilitate consolidation of successive layers of the tailings. Electrode anchors 112 are anchored to the base of the tailings pond and are secured to the electrodes 116 to keep the electrodes generally vertical and anchored within the tailings 146. The anchors 112 may be placed on the bottom of the tailings pond before any tailings are placed into the tailings pond. When the sleeves 110 are placed over the electrodes, the sleeves 110 together with the connectors 164 have some rigidity and provide additional stability. As the tailings pond consolidates, both the anchors 112 and the sleeves 110 hold the electrodes in place in the tailings pond. The consolidated solids also provide additional support for the electrodes. In the embodiment shown in FIG. 2, the power distribution routing system 124 is part of the connector 164.

Figure 6:
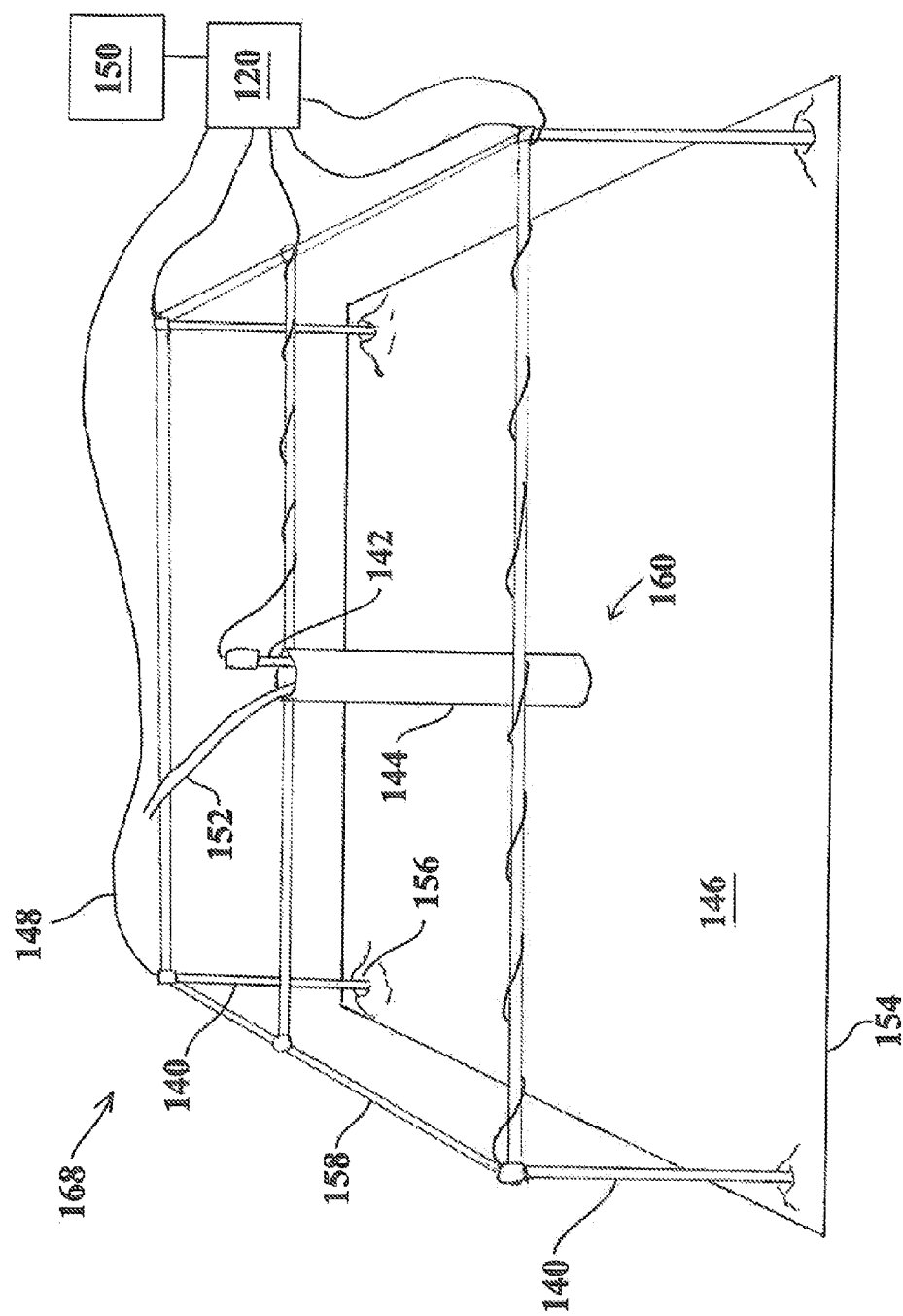
FIG. 6 is a side perspective view of a consolidation apparatus for treating tailings.

A control system 150, such as is shown in FIG. 6 may be connected to the consolidation apparatus 106 which is configured to provide an AC voltage with a DC offset to the electrodes 116 using a power supply 120. The control system 150 determines the initial parameters, for example, using equation 1, for each electrode based on a user's treatment specification; which may include shear strength, solids content, and throughput; the initial volume and physical properties such as solids content. Measured and calculated values of cumulative power and water recovered determine the treatment status may be used to modify the parameters that define the waveforms applied to specific electrodes. As would be understood by a person skilled in the art, the power supply 120 may be configured to provide an AC voltage with a DC offset to the electrodes.

Figure 3:
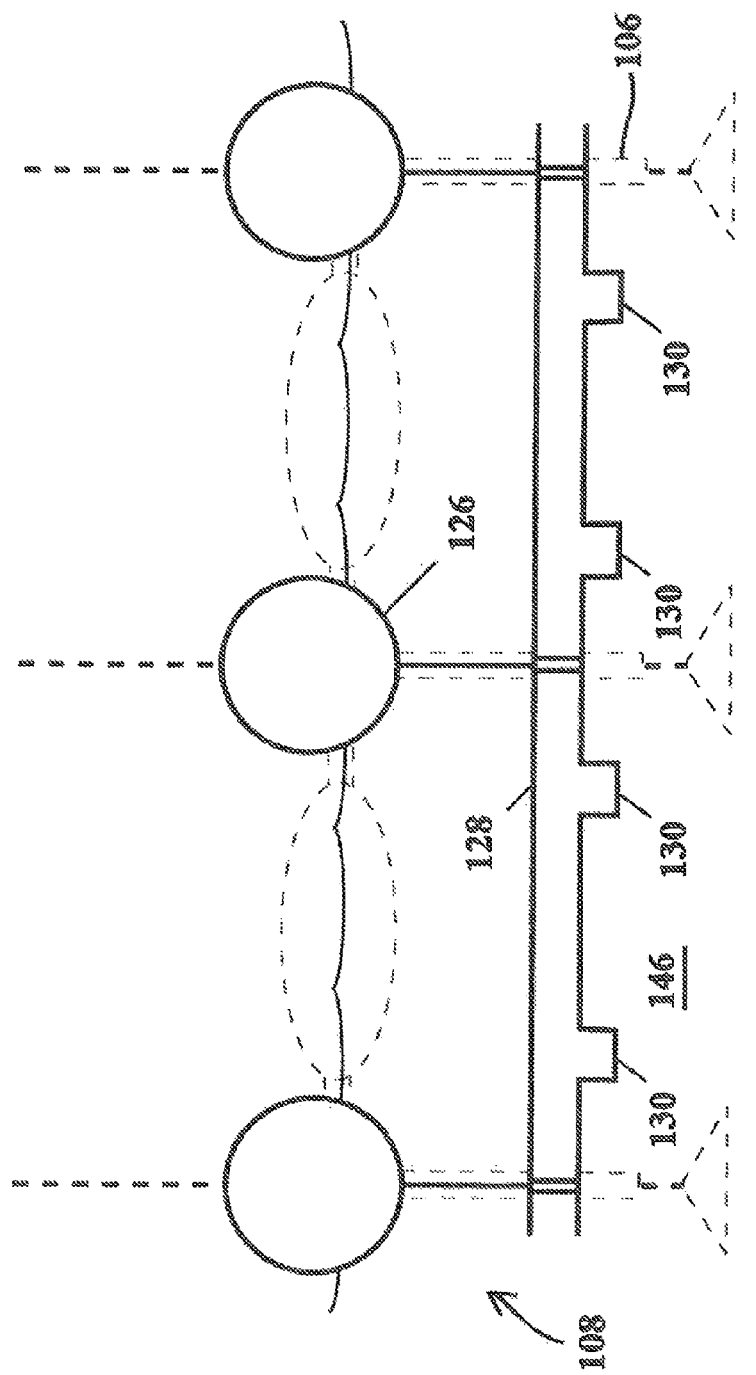
FIG. 3 is a side schematic view of a fines distribution apparatus for treating tailings.
Figure 4:
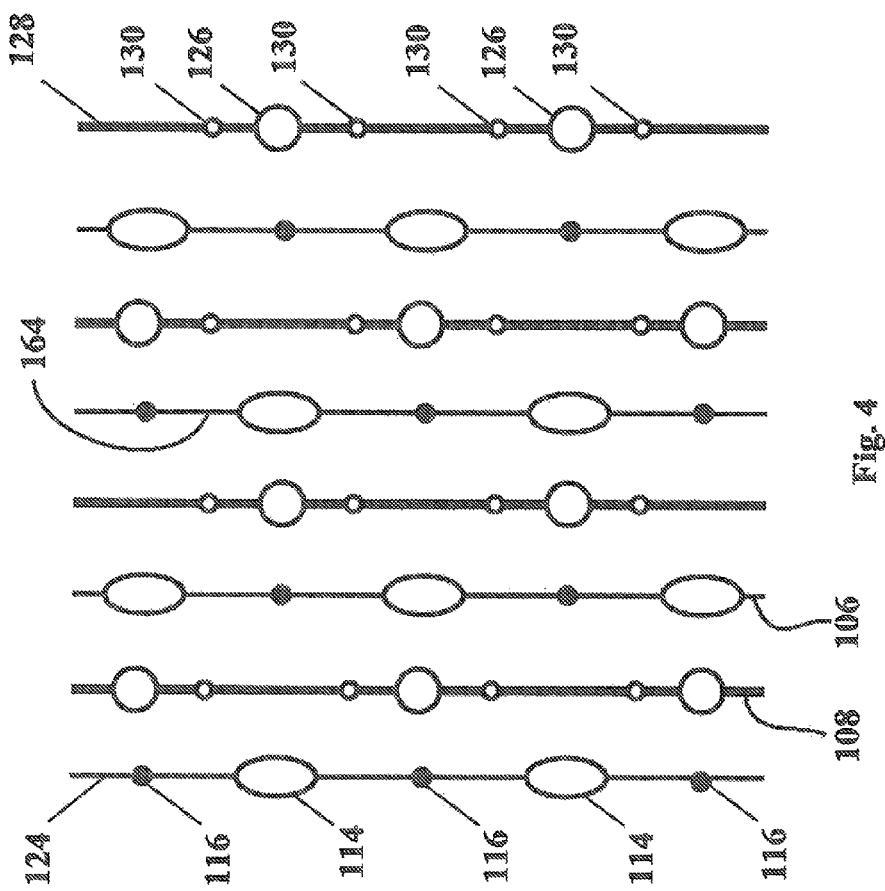
FIG. 4 is a top plan view of rows of consolidation apparatuses and distribution apparatuses for treating tailings.

As shown in FIG. 3, there is fine tailings distribution apparatus 108 which includes buoyant member 126 which is connected to a fine delivery piping 128 which includes a number of fine distribution openings 130. As shown best in FIG. 4, multiple fine tailings distribution apparatuses 108 and consolidation apparatuses 106 are placed in the tailings pond so that fine tailings may be distributed by the distribution apparatus 108 at the same time that the consolidation apparatus 106 treats the tailings. As shown in FIG. 4, the rows of distribution apparatuses 108 and consolidation apparatuses 106 may be placed in alternating sequence within the tailings. It would be understood by a person skilled in the art that different configurations of the distribution and consolidation apparatuses are possible. As the level of the tailings pond rises, both the sleeves 110 and the fine delivery piping 128 will rise and the uninsulated section 122 of the electrodes 116 will increase in length below the sleeve 110. In the embodiment shown in FIGS. 2-5, the base of the sleeve 110 is maintained at a height at approximately the same level as the fine distribution openings 130.

Figure 5:
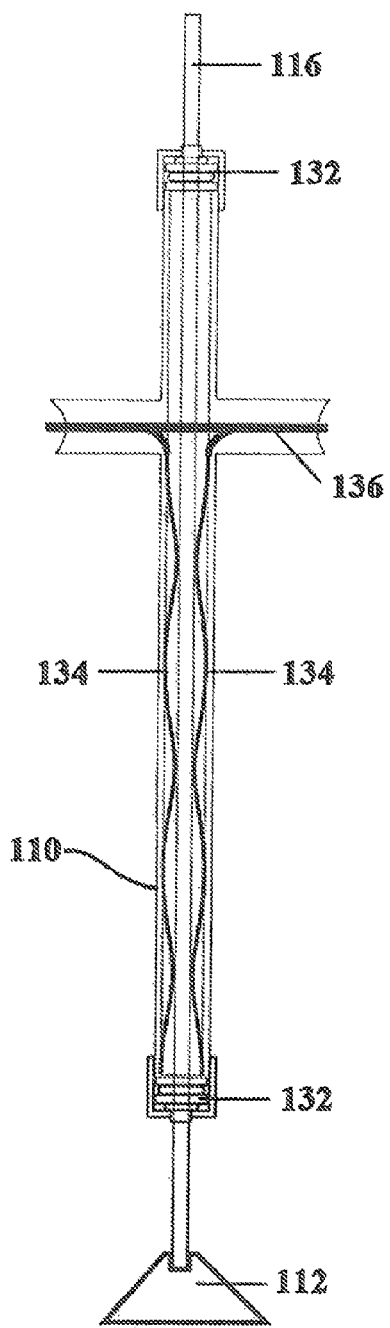
FIG. 5 is a side cutaway view of an electrode having a dielectric sleeve.

The components of the sleeve 110 are shown in more detail in FIG. 5. The sleeve 110 includes electrode gaskets 132 to seal the interior of the sleeve from the fine tailings. The power distribution cables 136 connect to electrical contact tabs 134 which provide the current to the electrode rod 116.

In operation, the consolidation apparatus 106 is placed into contact with the fine tailings. An AC voltage with a DC offset is provided to the electrodes 116 to induce separation of the water from the clay particles within the tailings. Added tailings are introduced into the tailings pond using the fines delivery piping 128. The location of the uninsulated section 122 and the insulated sections of the electrodes 116 are varied as the level of tailings rise to permit the application of the electrical current to facilitate consolidation of successive layers of the tailings. The buoyant member 114 floats at the same height as the top of the tailings 146 and so as added tailings are introduced, the buoyant member 114 rises and the sleeve 110 rises with it, exposing more of the uninsulated section 122 of the electrodes 116 below the base of the sleeve 110 as the sleeve rises.

In one embodiment, separated water is removed from the tailings as the tailings are treated. As the water is separated from the tailings it will collect close to the surface of the tailings and the clay particles will settle to the bottom. It is beneficial to keep the base of the sleeves below the bottom of the area defined by the collected water at the top of the tailings pond since exposing the electrodes to separated water may reduce the effectiveness of the treatment process.

Another consolidation apparatus 168 used to effect the action of the present invention on MFT/FFT is described below and shown in FIG. 6. Exterior electrodes 140 and central electrode 142 are each supported by a support structure 158 and submerged in fine tailings 146. In this embodiment, the electrodes 140 are anodes and electrode 142 is a cathode. A perforated sleeve or fiberglass sock 144 surrounds the cathode 142 and water is removed from the cathode using a water removal device such as tubing 152 connected to a pump (not shown). A control system 150 provides direct current biased alternating current through distribution cables 148 to the electrodes 140, 142. As shown in FIG. 6, as the direct current biased alternating current is applied between the anodes 140 and the cathode 142, clay particles collect around the anodes as shown by the build-up of solids 156 and water collects generally around the cathode as shown generally at 160. The fine tailings 146 lie in a treatment area 154 which may be either in situ or at a tailings treatment facility.

Example 1

An electric field with the combination of parameters that was found to be an efficient embodiment of a parameter control schedule that maximizes water production and compaction while minimizing power consumption is shown in Table 1. During a 72 hour lab to treat MFT with an initial volume of 20 liters of MFT at 38% solids, these parameters produced 7.5 liters of water and used 13.1 kWh of power.

Table 1 Effective Parameters for Treatment

TABLE 1

Effective Parameters for treatment

| Parameter | Symbol | Value | Units |
|---|---|---|---|
| Waveform | (W) | Sin | |
| DC Offset | A | 6 | $V_{DC}$ |
| AC Voltage (peak-to-peak) | D | 12 | $V_{AC}$ |
| Frequency | f | 10 | Hz |
| Phase Offset | φ | 0 | Degrees |
| Electrode Spacing | d | 12 | cm |

It would be understood by a person skilled in the art that different configurations of control systems may be used to apply an AC voltage with a DC offset to the tailings.

The application of an AC voltage with a DC offset through the electrodes can be varied in frequency and time to ensure that the electrodes do not overheat. Not all the electrodes need to be on at the same time, and pairs of electrodes can be activated at different times. Various arrangements of electrodes may be used and the electrodes can be turned on for various lengths of time. For example, the electrodes may alternate between which is the anode and which is the cathode every five minutes. if there are a network of electrodes, the electrodes which are on can be switched every 20 minutes, for example. Corrosion buildup and plating of minerals can be reduced by alternating the cathodes and anodes during application of the alternating current with direct current offset.

The present invention also comprehends being able to selectively treat sections of the tailings pond/treatment cell as local requirements demand. In the first instance the tailings ponds tend to be vast in area and to facilitate the treatment the present invention contemplates creating smaller treatment areas by means of sheet piling or the like, or by creating pressure barriers around the treatment area. This can be used to divide the area of the pond up into smaller areas or cells to facilitate treatment. The sheet pile may also be used as an electrode in some cases.

In one embodiment, it is desirable to treat the tailings so that the power expenses are less than $30/dry ton, 50% or better solids recovery and wherein the separated water is suitable for bitumen extraction.

Although the foregoing description has been made with respect to preferred embodiments of the present invention it will be understood by those skilled in the art that many variations and alterations are possible without departing from the broad spirit of the claims attached. Some of these variations have been discussed above and others will be apparent to those skilled in the art.

In the claims, the word "comprising" is used in its inclusive sense and does not exclude other elements being present. The indefinite article "a/an" before a claim feature does not exclude more than one of the feature being present unless it is clear from the context that only a single element is intended.

We claim:

1. A method of facilitating the consolidation of fine tailings through the application of an electrical current, the fine tailings including a combination of at least some water and same clay particles, the method comprising:
   causing at least two electrodes to come into contact with the fine tailings; and
   applying an AC voltage with a DC offset across the at least two electrodes to separate water from the clay particles and to induce movement of the separated water to a collection area wherein said separated clay particles can consolidate more readily than unseparated clay particles.

2. The method of claim 1 wherein applying an AC voltage with a DC offset comprises applying a sinusoidal AC voltage with a DC offset.

3. The method of claim 2 further comprising the step of extracting the separated water from the collection area within the fine tailings.

4. The method of claim 2 in which the application of an AC voltage with a DC offset creates a polarity between the at least two electrodes, and the method further comprising the step of periodically reversing the polarity of the at least two electrodes to preserve the electrodes.

5. The method of claim 2 in which applying an AC voltage with a DC offset across the at least two electrodes further comprises applying an AC voltage of up to 4 V/cm peak-to-peak and a DC offset of up to 1 V/cm.

6. The method of claim 5 in which an AC voltage with a DC offset across the at least two electrodes further comprises applying an AC voltage of about 1 V/cm peak-to-peak and a DC offset of about ½ V/cm.

7. The method of claim 2 wherein the tailings are at least one of oil sands extraction tailings and fly ash tailings.

8. The method of claim 2 wherein the tailings are mixed fine oil sands extraction tailings which further include residual hydrocarbons.

9. The method of claim 8 in which applying alternating current further comprises applying alternating current at a frequency of about 10 Hz or less.

10. The method of claim 9 in which applying alternating current further comprises applying alternating current at a frequency of about 10 Hz.

11. An apparatus for consolidating tailings at a tailings pond through the application of an electrical current, comprising:
   at least two powered electrodes;
   a support structure supporting the at least two electrodes at a fixed distance from one another when the electrodes are immersed in said tailings;
   a dielectric moveable sleeve surrounding at least one of the at least two electrodes to define an insulated section of the electrode within the sleeve and an uninsulated section of the electrode beyond the sleeve;
   a buoyant member which floats on said tailings; and
   a connector between the buoyant member and the moveable sleeve wherein as more tailings are added and the level of tailings rises, the buoyant member raises the dielectric moveable sleeve to permit the application of the electrical current to facilitate consolidation of the added tailings.

12. The apparatus of claim 11 further comprising an electrode anchor at the base of each of the at least two electrodes.

13. The apparatus of claim 11 in which the at least two electrodes comprise an array of electrodes supported by the support structure and in which each electrode in the array of electrodes has a said dielectric moveable sleeve surrounding the electrode.

14. The apparatus of claim 11 further comprising a control system configured to provide an AC voltage with a DC offset to the at least two electrodes.

15. A method for consolidating tailings at a tailings pond through the application of an electrical current, the fine tailings including a combination of at least some water and some clay particles, the method comprising:
- placing at least two electrodes into contact with the fine tailings, the at least two electrodes having an uninsulated section and an insulated section;
- providing an AC voltage with a DC offset to the at least two electrodes to induce separation of the water from the clay particles;
- introducing added tailings to the tailings pond;
- increasing the area of the uninsulated sections of the at least two electrodes which are in contact with the tailings as the level of tailings rises to permit the application of the electrical current to facilitate consolidation of the added tailings.

16. The method of claim 15 further comprising removing separated water from the tailings as the tailings are treated.

* * * * *